US009538351B1

(12) United States Patent
Chen et al.

(10) Patent No.: US 9,538,351 B1
(45) Date of Patent: Jan. 3, 2017

(54) SUPPORTING UNPROVISIONED EMERGENCY PHONE CALLS USING VOICE OVER WIRELESS LOCAL AREA NETWORK

(71) Applicant: Verizon Patent and Licensing Inc., Arlington, VA (US)

(72) Inventors: Xuming Chen, San Ramon, CA (US); Mingxing S. Li, San Jose, CA (US); Sudhakar Reddy Patil, Flower Mound, TX (US); Andrew J. Dock, Livingston, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/824,374

(22) Filed: Aug. 12, 2015

(51) Int. Cl.
*H04W 4/22* (2009.01)
*H04W 12/06* (2009.01)
*H04W 84/12* (2009.01)

(52) U.S. Cl.
CPC ............ *H04W 4/22* (2013.01); *H04W 12/06* (2013.01); *H04W 84/12* (2013.01)

(58) Field of Classification Search
CPC .............................. H04W 4/22; H04W 12/06
USPC ................ 455/404.1–404.2, 411, 466
See application file for complete search history.

(56) References Cited

U.S. PATENT DOCUMENTS

| 8,526,408 B2 * | 9/2013 | Zhang ................. H04L 63/08 340/5.81 |
| 9,143,989 B2 * | 9/2015 | Mutikainen ............ H04W 4/22 |
| 2010/0255808 A1 * | 10/2010 | Guo .................... H04W 76/007 455/404.1 |

\* cited by examiner

*Primary Examiner* — Michael T Vu

(57) ABSTRACT

A device may receive a first request to authenticate a user device for an emergency phone call requested by the user device via a wireless local area network (WLAN). The device may authenticate the user device based on the first request. The device may provide an authentication acceptance message, indicating that the user device is authenticated, based on authenticating the user device. The device may receive a second request, based on providing the authentication message, to establish the emergency phone call. The second request may include an emergency access point name (APN). The device may determine that the emergency APN is not provisioned for the user device. The device may provide, based on determining that the emergency APN is not provisioned, an instruction to allow the emergency phone call from the user device using the preconfigured APN.

20 Claims, 11 Drawing Sheets

SUPPORTING UNPROVISIONED EMERGENCY PHONE CALLS USING VOICE OVER WIRELESS LOCAL AREA NETWORK

BACKGROUND

Voice over wireless local area network (VoWLAN) is the use of a wireless broadband network for a voice call. Essentially, VoWLAN is voice over internet protocol (VoIP) using a wireless local area network (WLAN) as a gateway. Some network providers (e.g., cellular providers) have integrated a VoWLAN service into an operator network (e.g., a cellular network, such as a wireless wide area network (WWAN)) associated with the network provider. This integration allows user devices associated with the operator network to gain access to aspects of the operator network via a WLAN.

DETAILED DESCRIPTION OF PREFERRED EMBODIMENTS

The following detailed description of example implementations refers to the accompanying drawings. The same reference numbers in different drawings may identify the same or similar elements.

A network provider (e.g., a cellular provider) may integrate a VoWLAN service into an operator network (e.g., a cellular network, such as a wireless wide area network (WWAN)) associated with the network provider. This integration may allow user devices associated with the operator network to gain access to the operator network via a WLAN and make phone calls using the operator network. Typically, a user device may need to be provisioned for the VoWLAN service to gain access to the operator network via a WLAN. In some implementations, the user device may need to be separately provisioned to make emergency phone calls using the VoWLAN service, but in other implementations the user device may be able to make emergency phone calls using the VoWLAN service once the VoWLAN service is provisioned. Provisioning may include changes to the user device and/or changes to devices in the operator network to allow the user device to have access to the operator network via a WLAN.

At times, a user device may not be properly provisioned to make emergency phone calls using VoWLAN. This may happen because the user device is not specifically provisioned to make emergency phone calls using the VoWLAN service, or because the user device is not registered with the operator network and therefore not provisioned for any service. The user device may not be properly provisioned to make emergency phone calls using VoWLAN when, for example, the user device has yet to be set up for the operator network, has yet to be set up for the correct services for the operator network (e.g., the user device is not set up for VoWLAN service to make emergency phone calls when a user upgrades to a smart phone), or has not been properly provisioned (e.g., when an error is made in the provisioning process). The user device may not be provisioned for any service when the user device is not registered with the operator network. However, if the user device used to be registered with the operator network and is no longer registered with the operator network, the user device may be set up to attempt to access services through the operator network. In this case, the user device is not provisioned for any service.

Requiring user devices to be provisioned to make emergency phone calls using the VoWLAN service prior to using the operator network to establish the emergency phone call using VoWLAN, will block the ability of the user devices, which have not been provisioned, to make the emergency phone call. Implementations described herein allow user devices to establish an emergency phone call when the user device has not been provisioned for VoWLAN to make emergency phone calls via the VoWLAN service.

Figure 1:
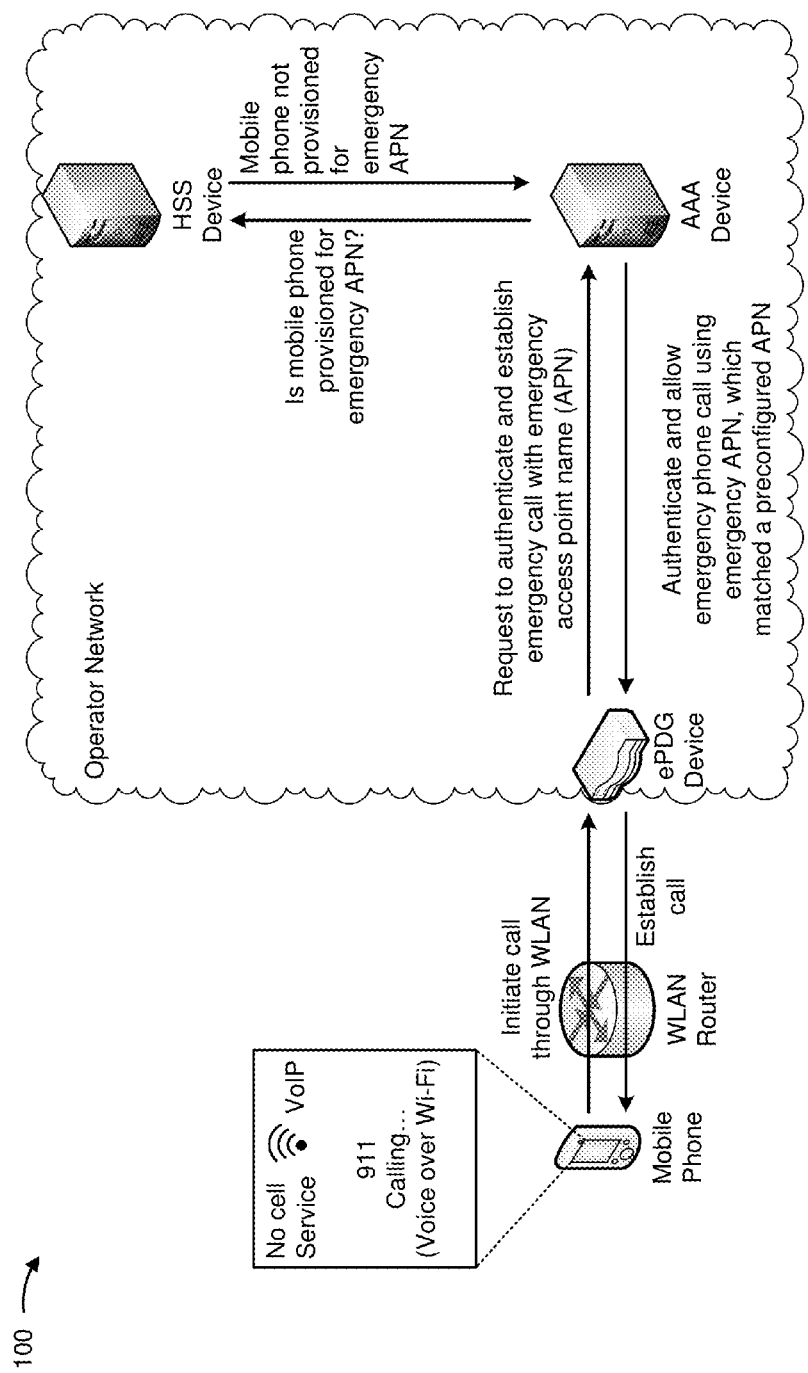
FIG. 1 is a diagram of an overview of an example implementation described herein.

FIG. 1 is a diagram of an overview of an example implementation 100 described herein. As shown in FIG. 1, assume that a mobile phone is out of range of a base station connected to an operator network and cannot receive signals from the base station. Furthermore, assume that the mobile phone is in range of a WLAN router and is receiving WLAN signals from the WLAN router. Assume that the mobile phone attempts to make an emergency phone call to 911 via the WLAN router. A request for the emergency phone call, from the user device, is forwarded via the WLAN router to an evolved packet data gateway (ePDG) device, which serves as a gateway to devices within the operator network. The request, for the emergency phone call, from the user device, may include an emergency access point name (APN), which is an identifier for a gateway for using the operator network for an emergency phone call using VoWLAN (e.g., the emergency APN could be an APN used for all phone calls using VoWLAN, or an APN used for emergency phone calls using VoWLAN only).

The ePDG device sends, to an authentication, authorization, and accounting (AAA) device, a request to authenticate and a request to establish the emergency phone call using the emergency APN. In some implementations, the AAA device determines if the mobile phone is provisioned for the emergency APN by communicating with a Home Subscriber Service (HSS) device. Based on information from the HSS device, the AAA device determines that the mobile phone is not provisioned for the APN. In some implementations, the AAA device may forgo determining that the user device is provisioned because the request was to establish an emergency phone call. However, the AAA device, uses one or more preconfigured APNs, stored by the AAA device, to allow the emergency phone call using the emergency APN. The AAA device instructs the ePDG device to set up the emergency phone call for the mobile phone.

Because the AAA stores preconfigured APNs for making emergency phone calls using VoWLAN, a user device can establish an emergency phone call using VoWLAN when the user device has not been provisioned for an emergency APN that permits an emergency phone call. Implementations described herein ensure that user devices, such as those that have not been properly provisioned or are not associated with the operator network, have access to emergency services by permitting the user devices to make emergency phone calls using VoWLAN.

Figure 2:
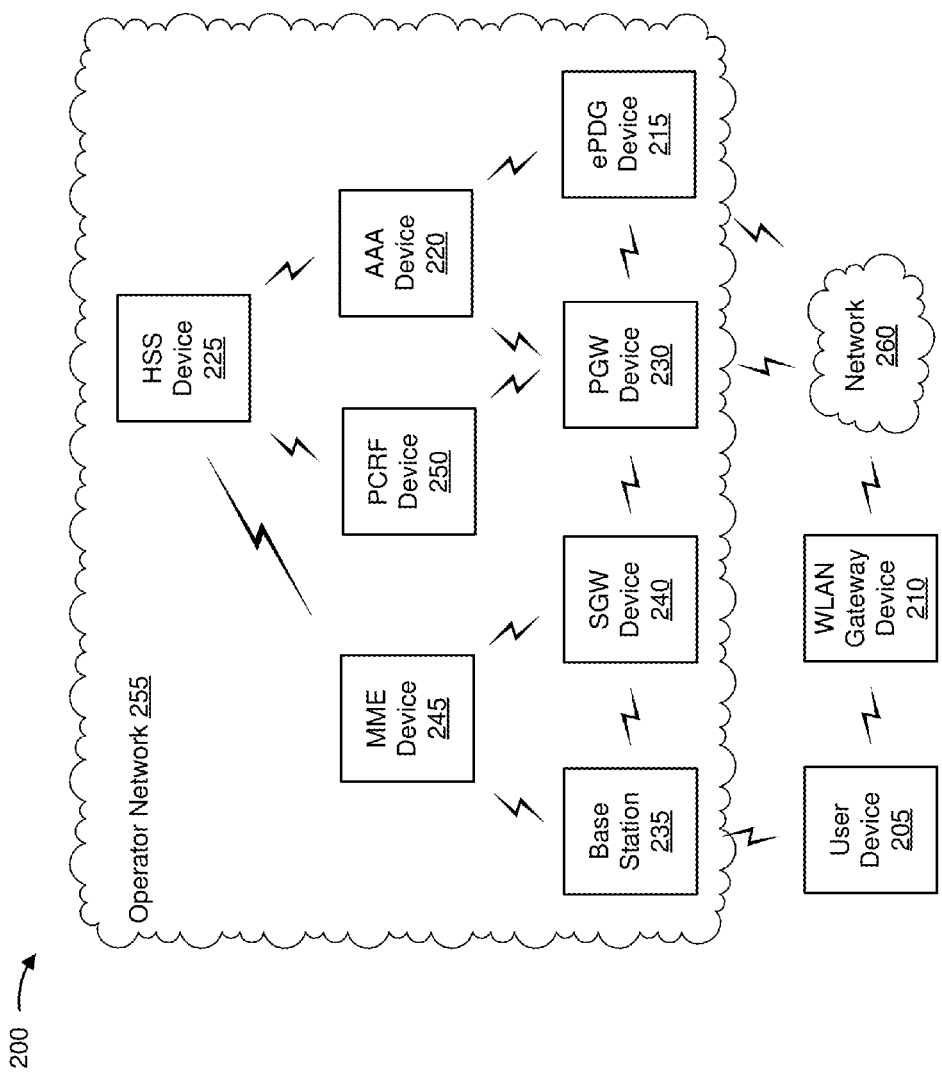
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 205; a wireless local area network (WLAN) gateway device 210; an evolved packet data gateway (ePDG) device 215; an authentication, authorization, and accounting (AAA) device 220; a home subscriber server (HSS) device 225; a packet data network gateway (PGW) device 230; a base station 235; a serving gateway (SGW) device 240; a mobility management entity (MME) device 245; a policy charging and rules function (PCRF) device 250; an operator network 255; and a network 260. Devices of environment 200 may interconnect via wired connections, wireless connections, or a combination of wired and wireless connections.

User device 205 may include one or more devices capable of receiving, generating, storing, processing, and/or providing information related to communicating with base station 235 and/or WLAN gateway device 210 (e.g., for an emergency phone call). For example, user device 205 may include a communication device, such as a mobile phone (e.g., a smart phone, a radiotelephone, etc.), a laptop computer, a tablet computer, a wearable communication device (e.g., a smart wristwatch, a pair of smart eyeglasses, etc.), a set-top box, or a similar type of device.

WLAN gateway device 210 may include one or more devices capable of communicating wirelessly with local devices, such as user device 205, and providing connectivity, for the local devices, to devices connected with an external network, such as network 260. For example, WLAN gateway device 210 may include a router, a modem, a switch, a hub, a bridge, a gateway, a WLAN access point, or a similar type of device. WLAN gateway device 210 may communicate wirelessly using one or more short-range wireless communication protocols, such as, for example, IEEE 802.15 (e.g., Bluetooth), IEEE 802.11 (e.g., Wi-Fi), or the like.

ePDG device 215 may include one or more devices capable of receiving, generating, storing, processing, and/or providing information in a manner described herein. For example, ePDG device 215 may include a data processing and/or traffic transfer device, such as a gateway, a router, a modem, a switch, a firewall, a NIC, a hub, a bridge, a proxy server, or a similar type of device that processes and/or transfers traffic.

AAA device 220 may include one or more devices, such as one or more server devices, that perform authentication, authorization, and/or accounting operations for communication sessions associated with user device 205. For example, AAA device 220 may perform authentication operations for user device 205 and/or a user of user device 205 (e.g., using one or more credentials), may control access, by user device 205, to a service and/or an application (e.g., based on one or more restrictions, such as time-of-day restrictions, location restrictions, single or multiple access restrictions, read/write restrictions, etc.), may track resources consumed by user device 205 (e.g., a quantity of voice minutes consumed, a quantity of data consumed, etc.), and/or may perform similar operations.

HSS device 225 may include one or more devices, such as one or more server devices, capable of managing (e.g., receiving, generating, storing, processing, and/or providing) information associated with user device 205. For example, HSS device 225 may manage subscription information associated with user device 205, such as information that identifies a user profile of a user associated with user device 205, information that identifies services and/or applications that are accessible to user device 205 (e.g., using an APN provisioned for user device 205), location information associated with user device 205, information that identifies user device 205, information that identifies a treatment of user device 205 (e.g., quality of service information, a quantity of minutes allowed per time period, a quantity of data consumption allowed per time period, etc.), and/or similar information.

PGW device 230 may include one or more devices capable of providing connectivity for user device 205 to external packet data networks. For example, PGW device 230 may include one or more data processing and/or traffic transfer devices, such as a gateway, a router, a modem, a switch, a firewall, a NIC, a hub, a bridge, a server device, an optical add/drop multiplexer (OADM), or any other type of device that processes and/or transfers traffic.

Base station 235 may include one or more devices capable of transferring traffic, such as audio, video, text, and/or other traffic, destined for and/or received from user device 205. In some implementations, base station 235 may include an eNodeB (eNB) associated with an LTE network. Additionally, or alternatively, one or more base stations 235 may be associated with a radio access network (RAN) that is not associated with the LTE network. Base station 235 may send traffic to and/or receive traffic from user device 205 via an air interface. In some implementations, base station 235 may include a small cell base station, such as a base station of a microcell, a picocell, and/or a femtocell.

SGW device 240 may include one or more devices capable of routing traffic. For example, SGW device 240 may include one or more data processing and/or traffic transfer devices, such as a gateway, a router, a modem, a switch, a firewall, a network interface card (NIC), a hub, a bridge, a server device, an OADM, or any other type of device that processes and/or transfers traffic. In some implementations, SGW device 240 may aggregate traffic received from one or more base stations 235 associated with the LTE network. Additionally, or alternatively, SGW device 240 may perform operations associated with handing off user device 205 to and/or from an LTE network.

MME device 245 may include one or more devices, such as one or more server devices, capable of managing authentication, activation, deactivation, and/or mobility functions associated with user device 205. In some implementations, MME device 245 may perform operations relating to authentication of user device 205. Additionally, or alternatively, MME device 245 may facilitate the selection of a particular SGW device 240 and/or a particular PGW device 230 to serve traffic to and/or from user device 205. MME device 245 may perform operations associated with handing off user device 205 from a first base station 235 to a second base station 235 when user device 205 is transitioning from a first cell associated with the first base station 235 to a second cell associated with the second base station 235. Additionally, or alternatively, MME device 245 may select another MME device 245, to which user device 205 should be handed off (e.g., when user device 205 moves out of range of MME device 245).

PCRF device 250 may include one or more devices, such as one or more server devices, that provide policy control decision and flow based charging control functionalities. PCRF device 250 may provide network control regarding service data flow detection, gating, QoS and flow based charging, etc. In some implementations, PCRF device 250 may determine how a certain service data flow is to be treated, and may ensure that user plane traffic mapping and treatment is in accordance with a user profile.

Operator network 255 may include an evolved packet system (EPS) that includes a long term evolution (LTE) network and/or an evolved packet core (EPC) that operate based on a third generation partnership project (3GPP) wireless communication standard. The LTE network may be a radio access network (RAN) that includes one or more base stations (e.g., base station 235), such as eNBs, via which user devices 205 (e.g., smart phones, tablet computers, etc.) communicate with the EPC. The EPC may include SGW device 240, MME device 245, and/or PGW device 230 that enables the client devices to communicate with network 260 and/or an Internet protocol (IP) multimedia subsystem (IMS) core. The IMS core may include HSS device 225, AAA device 220, PCRF device 250, and/or a call session control function (CSCF) server and may manage certain information and services, such as authentication, session initiation, account information, and/or a user profile, associated with the client devices. The LTE network may include multiple base stations 235, and the EPC may include multiple SGW devices 240, MME devices 245, and/or PGW devices 230. Additionally, or alternatively, operator network 255 may include a cellular network, a public land mobile network (PLMN), a second generation (2G) network, a third generation (3G) network, a fourth generation (4G) network, a fifth generation (5G) network, and/or a similar type of network.

Network 260 may include one or more wired and/or wireless networks. For example, network 260 may include a cellular network (e.g., an LTE network, a 3G network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
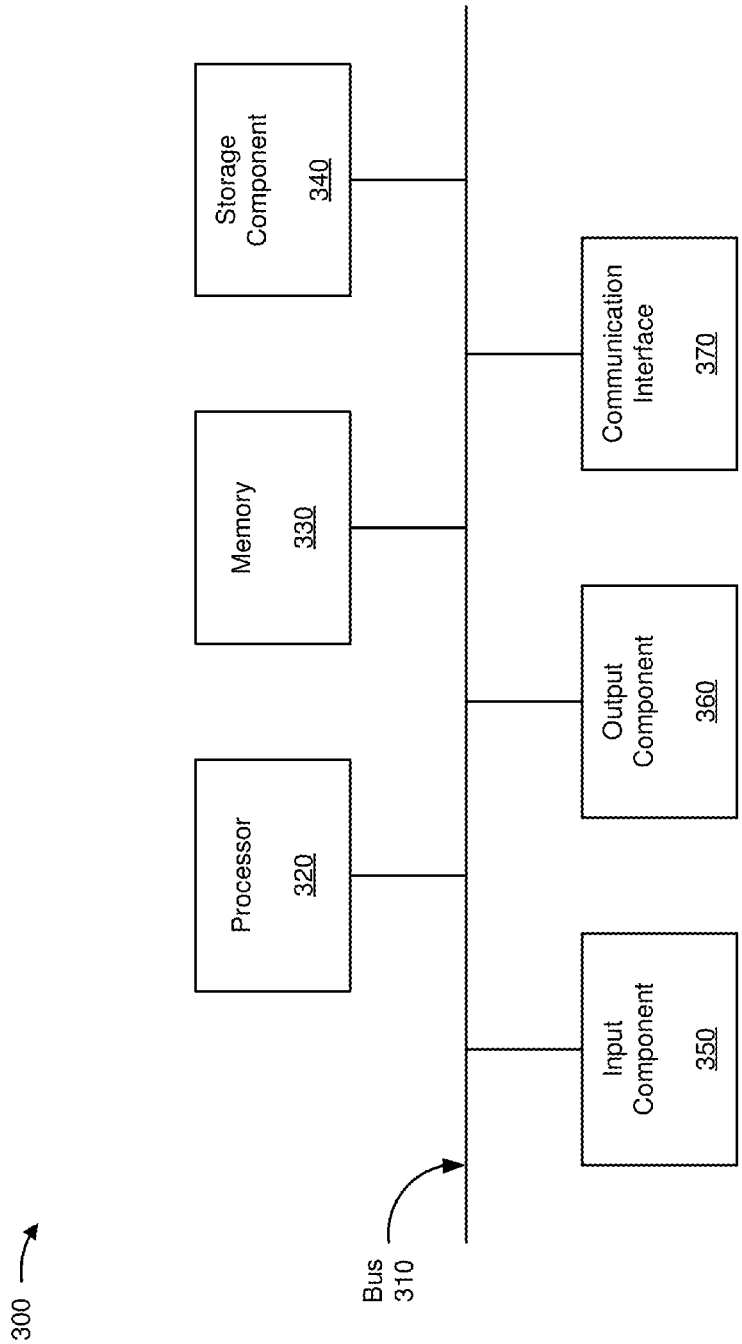
FIG. 3 is a diagram of example components of one or more devices of FIG. 2.

FIG. 3 is a diagram of example components of a device 300. Device 300 may correspond to user device 205, WLAN gateway device 210, ePDG device 215, AAA device 220, HSS device 225, PGW device 230, base station 235, SGW device 240, MME device 245, and/or PCRF device 250. In some implementations, user device 205, WLAN gateway device 210, ePDG device 215, AAA device 220, HSS device 225, PGW device 230, base station 235, SGW device 240, MME device 245, and/or PCRF device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, processor 320 may include one or more processors capable of being programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
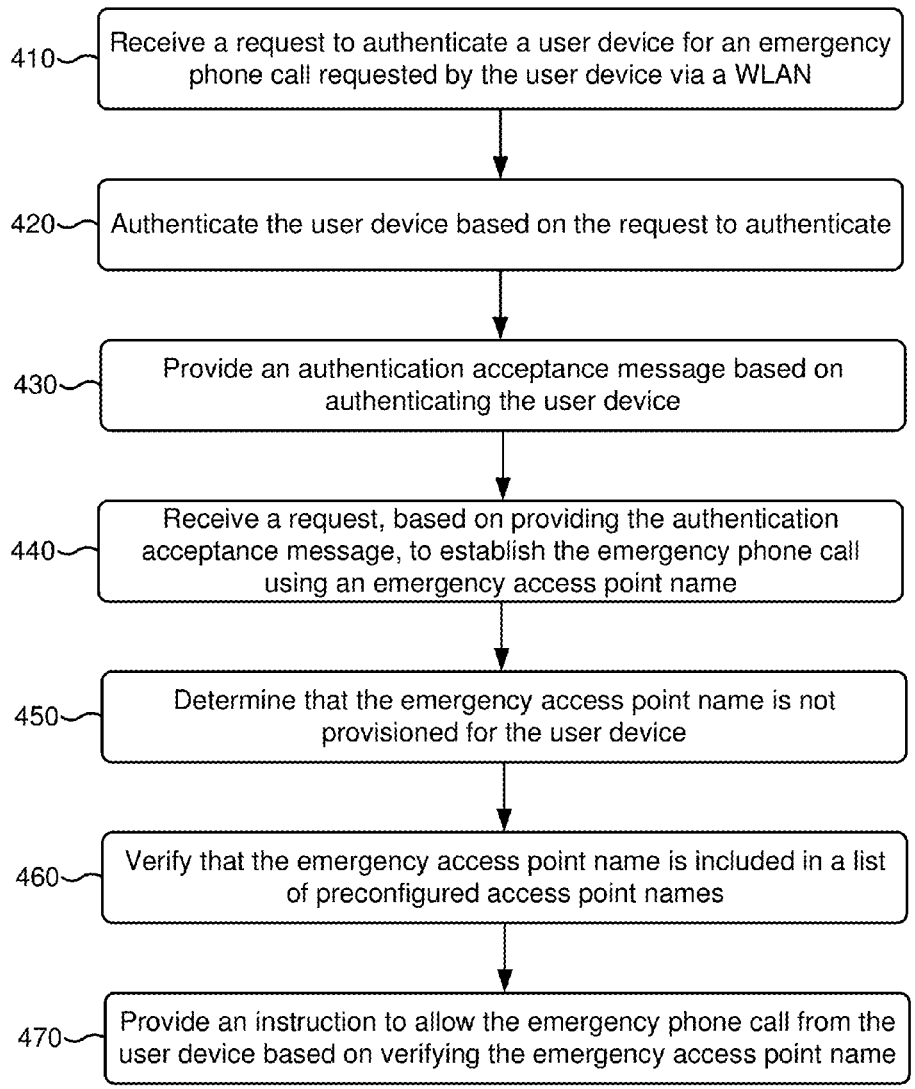
FIG. 4 is a flow chart of an example process for supporting an emergency phone call using voice over wireless local area network (VoWLAN) for a user device that has not been provisioned for VoWLAN service for the emergency phone call using VoWLAN.

FIG. 4 is a flow chart of an example process 400 for supporting an emergency phone call using voice over wireless local area network (VoWLAN) for a user device that has not been provisioned for the emergency phone call using VoWLAN. In some implementations, one or more process blocks of FIG. 4 may be performed by AAA device 220. In some implementations, one or more process blocks of FIG. 4 may be performed by another device or a group of devices separate from or including AAA device 220, such as user device 205, WLAN gateway device 210, ePDG device 215, HSS device 225, PGW device 230, base station 235, SGW device 240, MME device 245, and/or PCRF device 250.

As shown in FIG. 4, process 400 may include receiving a request to authenticate a user device for an emergency phone call requested by the user device via a WLAN (block 410). For example, AAA device 220 may receive a request to authenticate a user device 205 from ePDG device 215. The request to authenticate may be based on an emergency phone call requested by user device 205.

In some implementations, user device 205 may request the emergency phone call via WLAN. User device 205 may request the emergency phone call using the WLAN (rather than a cellular network) for many possible reasons. For example, user device 205 may be out of range of any signals associated with base station 235, user device 205 may be receiving weak signals from base station 235, a wireless wide area network (WWAN) may be turned off, or user device 205 may be connected to the WLAN and the WWAN, but may be using the WLAN. User device 205 may access ePDG device 215 via WLAN gateway device 210 using the WLAN. User device 205 may communicate with ePDG device 215 in an attempt to make the emergency phone call using operator network 255. In turn, ePDG device 215 may send AAA device 220 a request to authenticate.

In some implementations, the request to authenticate may include information that identifies user device 205 (e.g., a user device identifier). For example, the user device identifier may include an international mobile subscriber identify (IMSI), a mobile directory number (MDN), or the like.

Additionally, or alternatively, the request to authenticate may include an indication that the request to authenticate is for an emergency phone call. The indication may be based on an access point name (APN), requested by user device 205, being known as an emergency APN used for emergency phone calls (e.g., "Emergency_APN), or may be a separate indication. An emergency phone call may be any phone call that is made to a pre-established emergency phone number, such as 911 in the United States.

In some implementations, the request to authenticate may include a particular type of message, such as a diameter extensible authentication protocol (EAP) message (e.g., a Diameter-EAP-Request (DER) command). The DER command may include specific content, such as the string of characters "AUTHORIZE_AUTHENTICATE" to show that the DER command is a request to authenticate.

As further shown in FIG. 4, process 400 may include authenticating the user device based on the request to authenticate (block 420). For example, AAA device 220 may authenticate user device 205 based on the request to authenticate. AAA device 220 may authenticate user device 205 by verifying that user device 205 is associated with operator network 255. For example, AAA device 220 may send an authentication verification message along with the user device identifier to HSS device 225. HSS device 225 may verify that user device 205 is associated with operator network 255 using the user device identifier, and may send an answer which indicates whether user device 205 is authenticated.

In some implementations, the authentication verification message may include a particular type of message, such as a Multimedia-Authentication-Request (MAR) command, and may include an IMSI as the user device identifier. Additionally, or alternatively, the answer which indicates whether user device 205 is authenticated may include a particular type of message, such as a Multimedia-Authentication-Answer (MAA) command.

In some implementations, AAA device 220 may not send an authentication verification message, to HSS device 225, and may instead authenticate user device 205 based on the indication that the request to authenticate is for an emergency phone call. In this way, AAA device 220 may authenticate user device 205 regardless of whether user device 205 is associated with operator network 255 (e.g., regardless of whether HSS device 225 stores information about user device 205). By authenticating user device 205 regardless of an association that user device 205 has with operator network 255, AAA device is allowing for more user devices 205 to be authenticated and to make the emergency phone call using WLANs.

As further shown in FIG. 4, process 400 may include providing an authentication acceptance message based on authenticating the user device (block 430). For example, AAA device 220 may provide an authentication acceptance message, to ePDG device 215, based on authenticating user device 205. In turn, the ePDG device 215 may provide the authentication acceptance message to user device 205.

In some implementations, the authentication acceptance message may include a particular type of message, such as a Diameter-EAP-Answer (DEA) command. The DEA command may include an EAP-Payload, which may be used as a key for mutual authentication (e.g., to identify that any future message, which includes the EAP-payload, is from a party that received the EAP-Payload). The EAP-Payload may be a string of characters, or the like.

As further shown in FIG. 4, process 400 may include receiving a request, based on providing the authentication acceptance message, to establish the emergency phone call using an emergency access point name (block 440). For example, AAA device 220 may receive a request to establish the emergency phone call from ePDG device 215, which in turn may have received the request from user device 205 after user device 205 and/or ePDG device 215 receives the authentication acceptance message.

In some implementations, the request to establish the emergency phone call may include an emergency access point name (APN). An APN may be a specific name (e.g., a string of characters, or the like) which may be used to identify an access point to a packet data service (PDS). The access point to a PDS may be a PGW device 230, or the like. The emergency APN may be the APN that user device 205 is attempting to use for the emergency phone call.

In some implementations, the request to establish the emergency phone call may include a particular type of message, such as a DER command. The DER command may include specific content, such as the string of characters "AUTHORIZE_AUTHENTICATE" to indicate that the DER command is an attempt to authorize the emergency phone call. Additionally, or alternatively, the DER command may include the EAP-payload from the DEA, which may be used as a key for mutual authentication. Additionally, or alternatively, the DER command may include the emergency APN in a field specifically designed to carry information that indicates an APN requested by user device 205.

As further shown in FIG. 4, process 400 may include determining that the emergency access point name is not provisioned for the user device (block 450). For example, AAA device 220 may determine that the emergency APN is not provisioned for user device 205. Provisioning may include causing changes to user device 205 and/or causing changes to devices in operator network 255 to allow user device 205 to use operator network 255 for an emergency phone call via a WLAN. User device 205 may be provisioned to use an APN for a service when configuration information, associated with the APN, is stored (e.g., by HSS device 225) in association with a user device identifier of user device 205. For example, user device 205 may be provisioned for a particular service using a particular APN (e.g., an APN for emergency services, an APN for normal data, an APN for normal phone calls, etc.) when the configuration information associated with the particular APN is stored in association with user device 205. The configuration information may allow a user device 205 to communicate with the access point and to obtain a service through the access point, and may identify an APN of the access point, a network address of the access point, a protocol to use, a list of instructions to follow, a port, a signature, a cryptographic key, and/or the like. If there is no configuration information, for using the emergency APN, stored in association with a user device identifier of user device 205, then user device 205 may not be provisioned for the requested APN.

In some implementations, such as when user device 205 is authenticated based on user device 205 being associated with operator network 255, AAA device 220 may send a message, to HSS device 225, with the emergency APN in an attempt to obtain the configuration information necessary for using the emergency APN and to establish the emergency phone call. In some implementations, the message that AAA device 220 sends to HSS device 225 may be a Server-Assignment-Request (SAR) command, and may include the user device identifier (e.g., an IMSI). HSS device 225 may not have the configuration information associated with the emergency APN in a user profile associated with user device 205. In this case, HSS device 225 may send a message to AAA device 220 that indicates the emergency APN is not provisioned for user device 205. In some implementations, the message that indicates that the emergency APN is not provisioned may be a Server-Assignment-Answer (SAA) command, and may include information about the user profile associated with user device 205. This implementation may be used for user devices 205 subscribed with operator network 255, but not provisioned for the emergency phone call.

In some implementations, such as when user device 205 is authenticated based on the indication that the request to authenticate was for an emergency phone call, AAA device 220 may not send a message to HSS device 225. In this case, AAA device 220 may avoid sending a message to HSS device 225 because AAA device 220 identifies that user device 205 is not associated with operator network 255 and/or because AAA device 220 is configured to set up the emergency phone call without needing to get configuration information associated with the emergency APN from HSS device 225. This implementation may be used for user devices 205 not registered with operator network 255. By not needing to get the configuration information from HSS Device 225, AAA device 220 saves time and saves processor and memory resources associated with sending additional messages.

As further shown in FIG. 4, process 400 may include verifying that the emergency access point name is included in a list of preconfigured access point names (block 460). For example, AAA device 220 may verify that the emergency APN is included in a list of preconfigured APNs stored by AAA device 220. The list of preconfigured APNs may be stored in a data structure. Additionally, or alternatively, AAA device 220 may store configuration information associated with the preconfigured APNs. AAA device 220 may match the emergency APN to an APN stored in the data structure to verify that an emergency phone call, via the WLAN, using the emergency APN may be allowed.

The configuration information may include information that allows user device 205 to use services (e.g., emergency services) associated with an APN, as described above. In some implementations, if the emergency APN is not in the list of preconfigured APNs, AAA device 220 may use a preconfigured APN included in the list of preconfigured APNs in place of the emergency APN when establishing the emergency phone call. By using the preconfigured APN, AAA device 220 may provide user device 205 access to emergency services, associated with operator network 255, through the preconfigured APN, as described below.

Additionally, or alternatively, AAA device 220 may verify that the user profile information includes another APN (e.g., an IP Multimedia Subsystem APN) or other information that indicates that user device 205 is allowed to make the emergency phone call. AAA device 220 may use the user profile information in making a determination of whether the emergency phone call may be allowed.

As further shown in FIG. 4, process 400 may include providing an instruction to allow the emergency phone call from the user device based on verifying the emergency access point name (block 470). For example, AAA device 220 may send an instruction, to ePDG device 215, to allow the emergency phone call from user device 205 based on verifying the emergency APN. In turn, ePDG device 215 may establish the emergency phone call requested by user device 205.

In some implementations, the instruction may include the configuration information associated with the emergency APN or the preconfigured APN that replaced the emergency APN. Additionally, or alternatively, the instruction may include a particular type of message, such as a DEA command. The DEA command may include specific content, such as the string of characters "DIAMETER_SUCCESS" to show that the request (e.g., the DER) was successful and that the emergency phone call is allowed. Additionally, or alternatively, the DER may include an EAP-Master-Session-Key, which may be used as a cryptographic key for secure communications between ePDG device 215 and user device 205.

Because the AAA device 220 stores preconfigured APNs, a user device 205 can establish an emergency phone call using VoWLAN when user device 205 has not been provisioned with the emergency APN that permits the emergency phone call. Implementations described herein ensure that user devices 205, such as those that have not been properly provisioned or are not associated with the operator network 255, have access to emergency services by permitting the user devices 205 to make emergency phone calls using VoWLAN, thereby providing easier access to emergency services.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIGS. 5A-5D are diagrams of an example implementation 500 relating to example process 400 shown in FIG. 4. FIGS. 5A-5D show an example of supporting an emergency phone call using voice over wireless local area network (VoWLAN) for a user device that has not been provisioned for the emergency phone call using VoWLAN, but that is registered with an operator network.

Figure 5A:
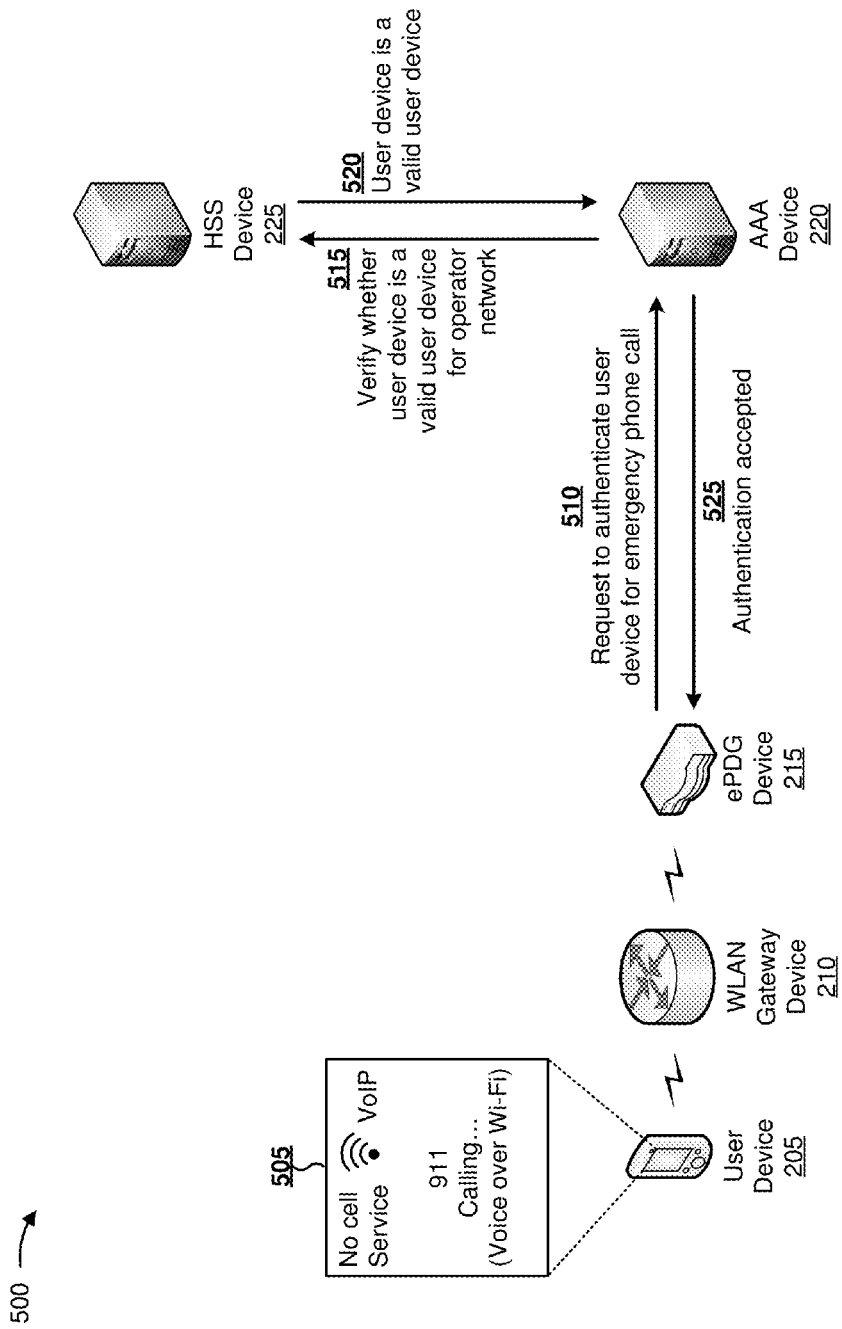
FIGS. 5A-5D are diagrams of an example implementation relating to the example process shown in FIG. 4.

As shown in FIG. 5A, and by reference number 505, assume that user device 205 is making an emergency phone call to 911 using VoWLAN (e.g., voice over Wi-Fi) via WLAN gateway device 210 and ePDG device 215. As shown by reference number 510, ePDG device 215 sends a request, to AAA device 220, to authenticate user device 205 for the emergency phone call. As shown by reference number 515, AAA device 220 sends an authentication verification message to HSS device 225 to verify whether user device 205 is a valid user device 205 for operator network 255 (e.g., whether user device 205 is registered with operator network 255). As shown by reference number 520, HSS device 225 verifies that user device 205 is associated with operator network 255 and sends an answer to AAA device 220 affirming that user device 205 is a valid user device 205 for operator network 255. As shown by reference number 525, AAA device 220 accepts the authentication of user device 205 and sends an authentication acceptance message to ePDG device 215 indicating that user device 205 has been authenticated.

Figure 5B:
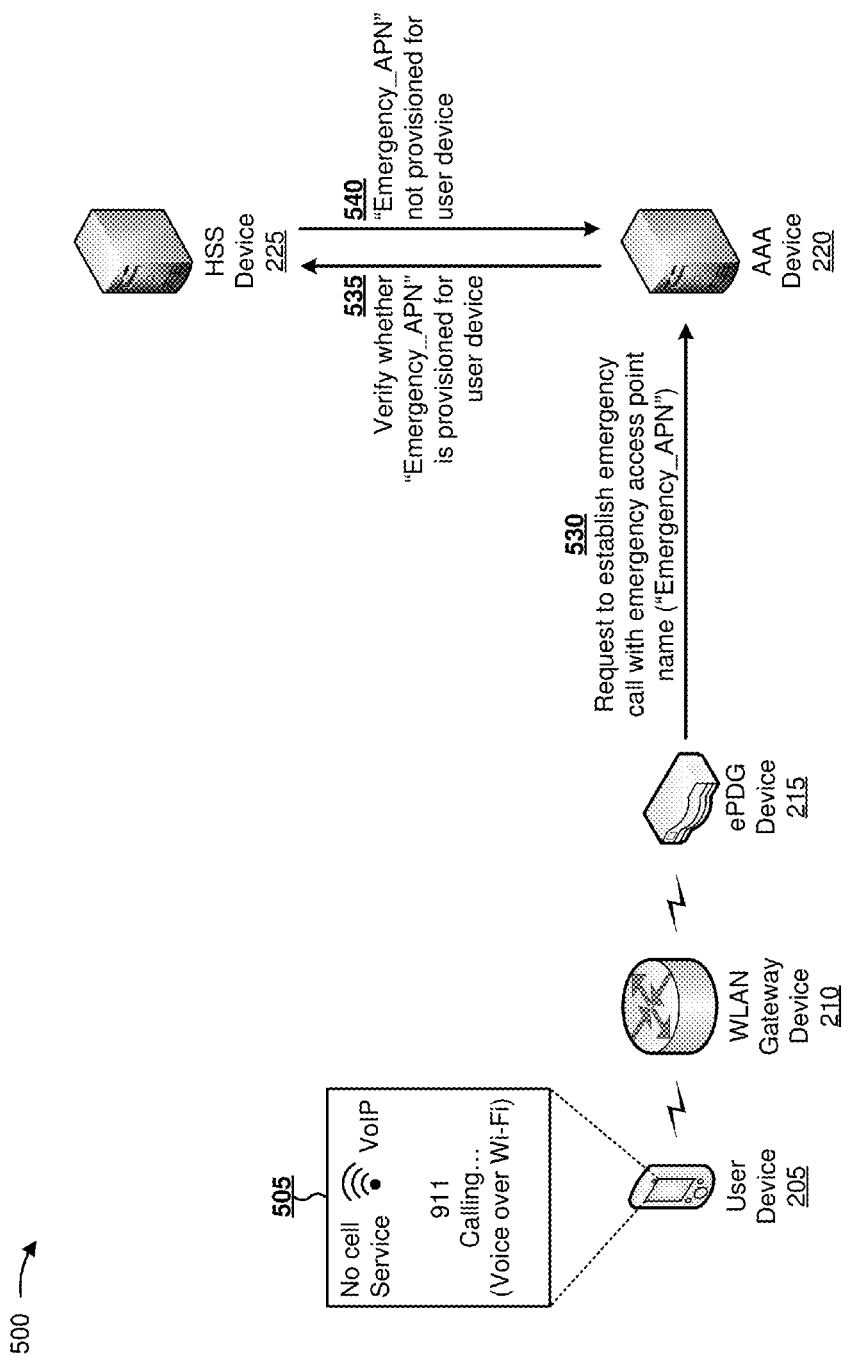

As shown in FIG. 5B, and by reference number 530, ePDG device 215, having received the authentication acceptance message, now sends a request, to AAA device 220, to establish the emergency phone call for user device 205 using an emergency access point name (APN) (e.g., "Emergency_APN," as shown). As shown by reference number 535, AAA device 220 verifies, with HSS device 225, whether "Emergency_APN" is provisioned for user device 205. As shown by reference number 540, AAA device 220 determines, based on a message received from HSS device 225, that "Emergency_APN" is not provisioned for user device 205. In other words, AAA device 220 determines that user device 205 is not provisioned for emergency phone calls using VoWLAN.

Figure 5C:
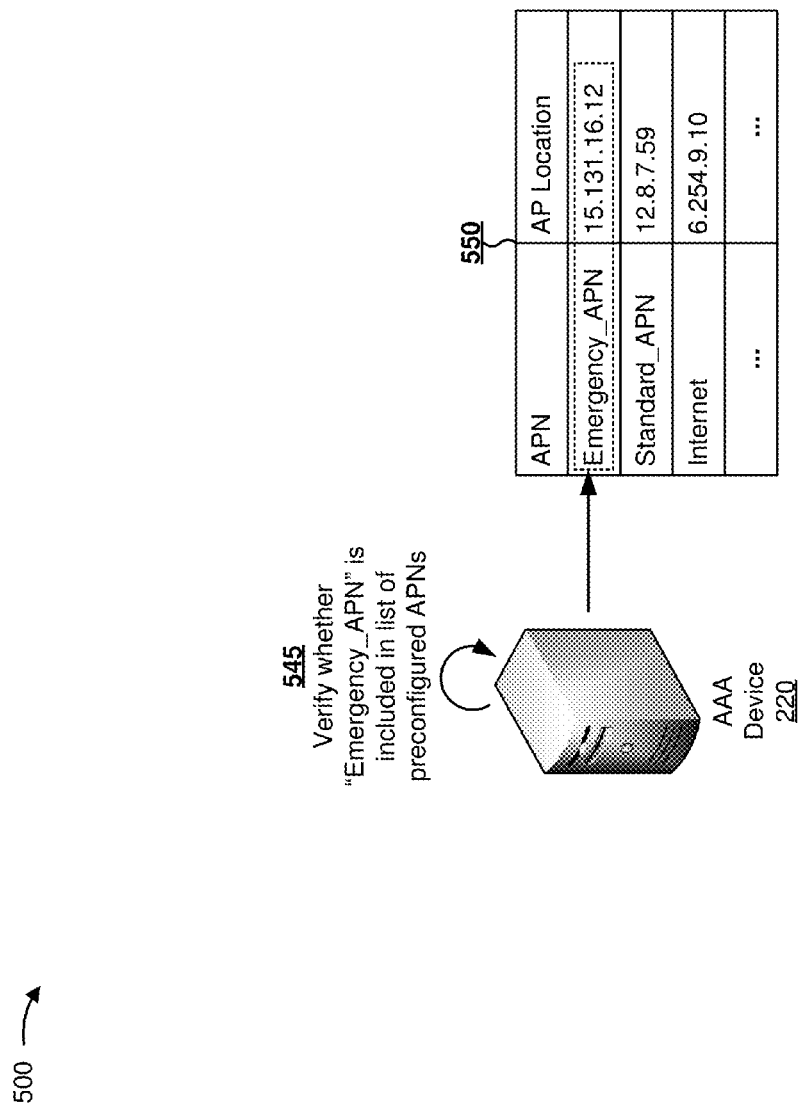

As shown in FIG. 5C, and by reference number 545, AAA device 220 verifies whether "Emergency_APN" is included in a list of preconfigured APNs. As shown by reference number 550, "Emergency_APN" is included in a data structure, stored by AAA device 220, that associates "Emergency_APN" with a location of the access point (AP location) identified by the internet protocol (IP) address 15.131.16.12. The location of the access point may be used to communicate with the access point and to establish the emergency phone call. AAA device 220 may store other configuration information about "Emergency_APN" and other APNs, beyond what is shown, which may be used to establish the emergency phone call.

Figure 5D:
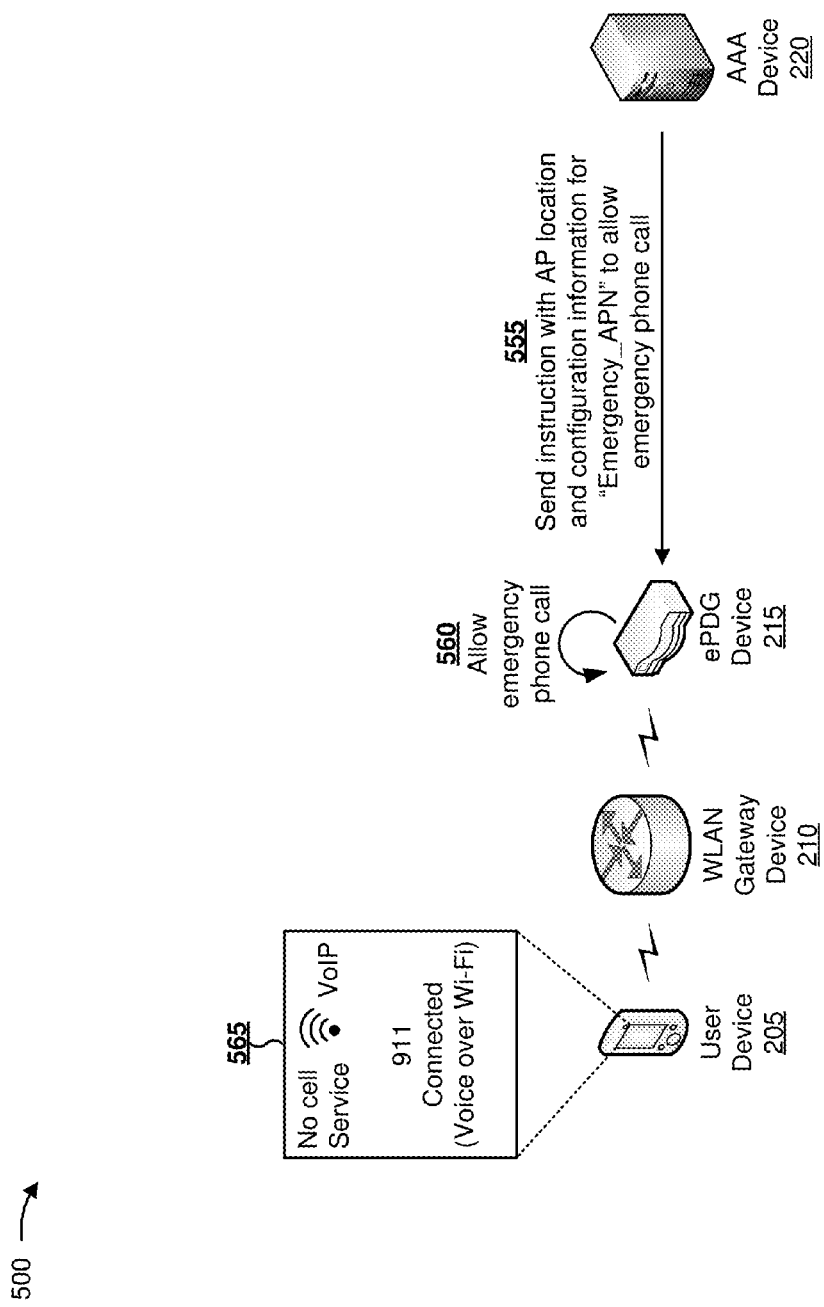

As shown in FIG. 5D, and by reference number 555, AAA device 220 sends, to ePDG device 215, an instruction to allow the emergency phone call. The instruction identifies the location of the access point for "Emergency_APN" (e.g., the IP address 15.131.16.12) and the configuration information for "Emergency_APN." As shown by reference number 560, ePDG device 215 allows the emergency phone call for user device 205. As shown by reference number 565, user device 205 is allowed to establish the emergency phone call and the user device 205 is connected with 911, even though user device 205 was not provisioned for the emergency APN or another APN. In this implementation, AAA device 220 may allow more emergency phone calls by allowing user devices 205, which are not provisioned to make emergency phone calls using VoWLAN, to make emergency phone calls.

As indicated above, FIGS. 5A-5D are provided merely as an example. Other examples are possible and may differ from what was described with regard to FIGS. 5A-5D.

Figure 6A:
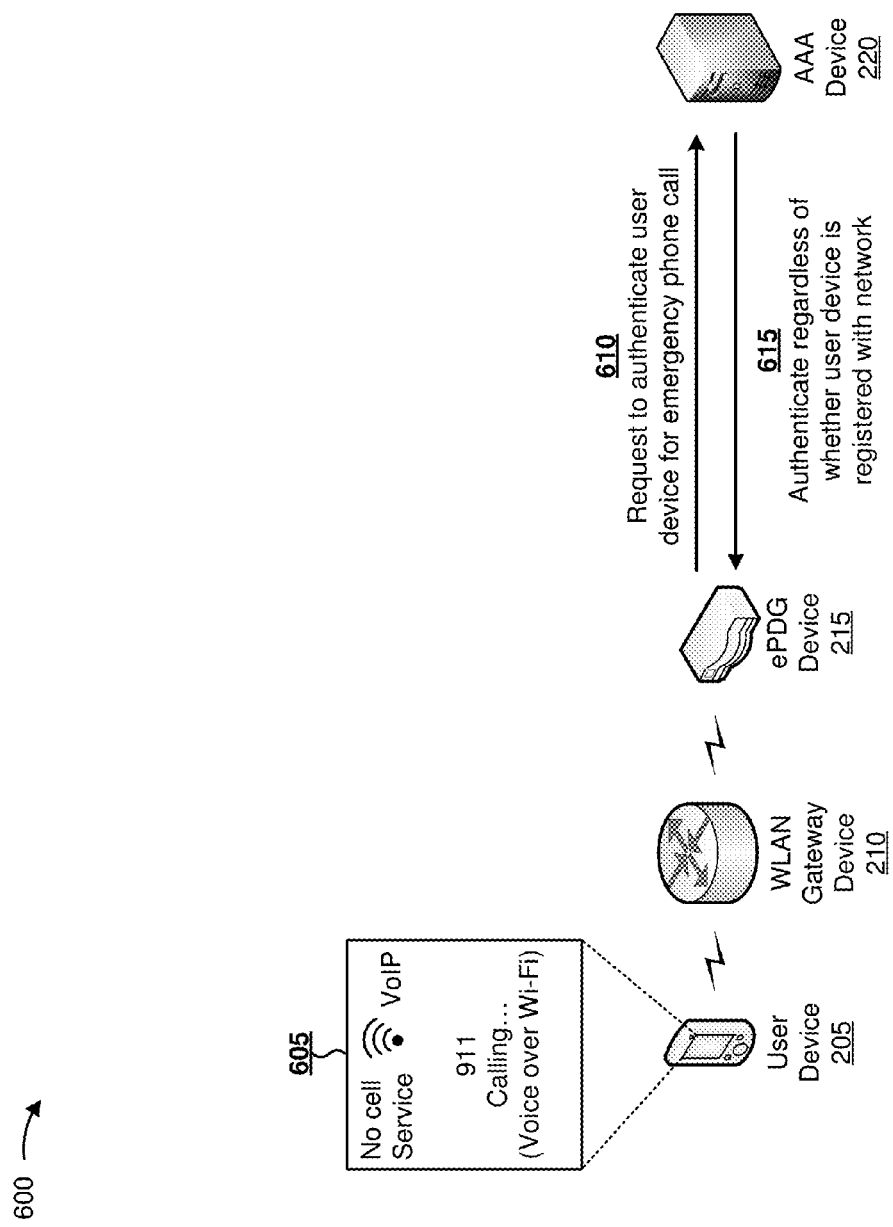
FIGS. 6A-6C are diagrams of an example implementation relating to the example process shown in FIG. 4.
Figure 6B:
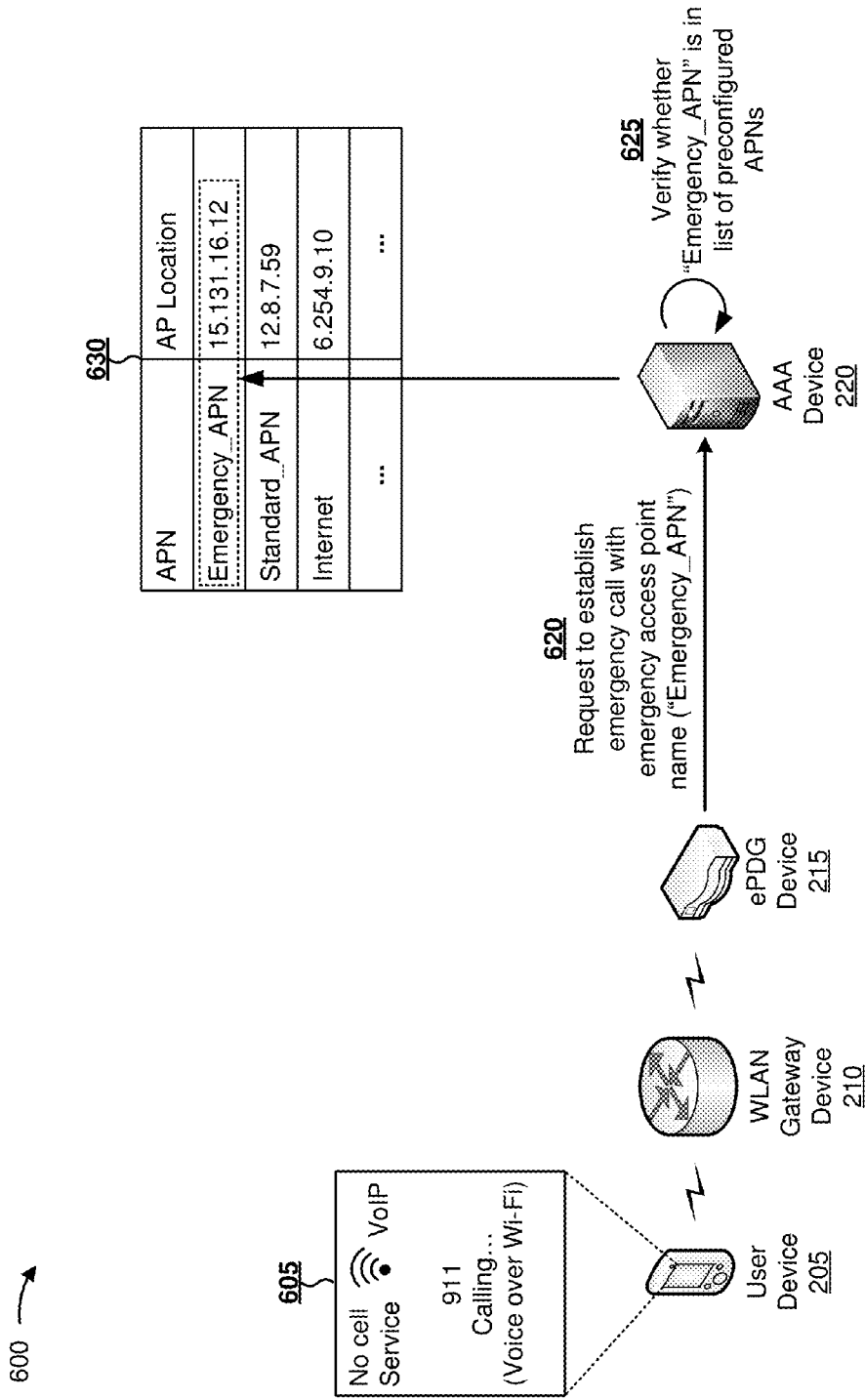
Figure 6C:
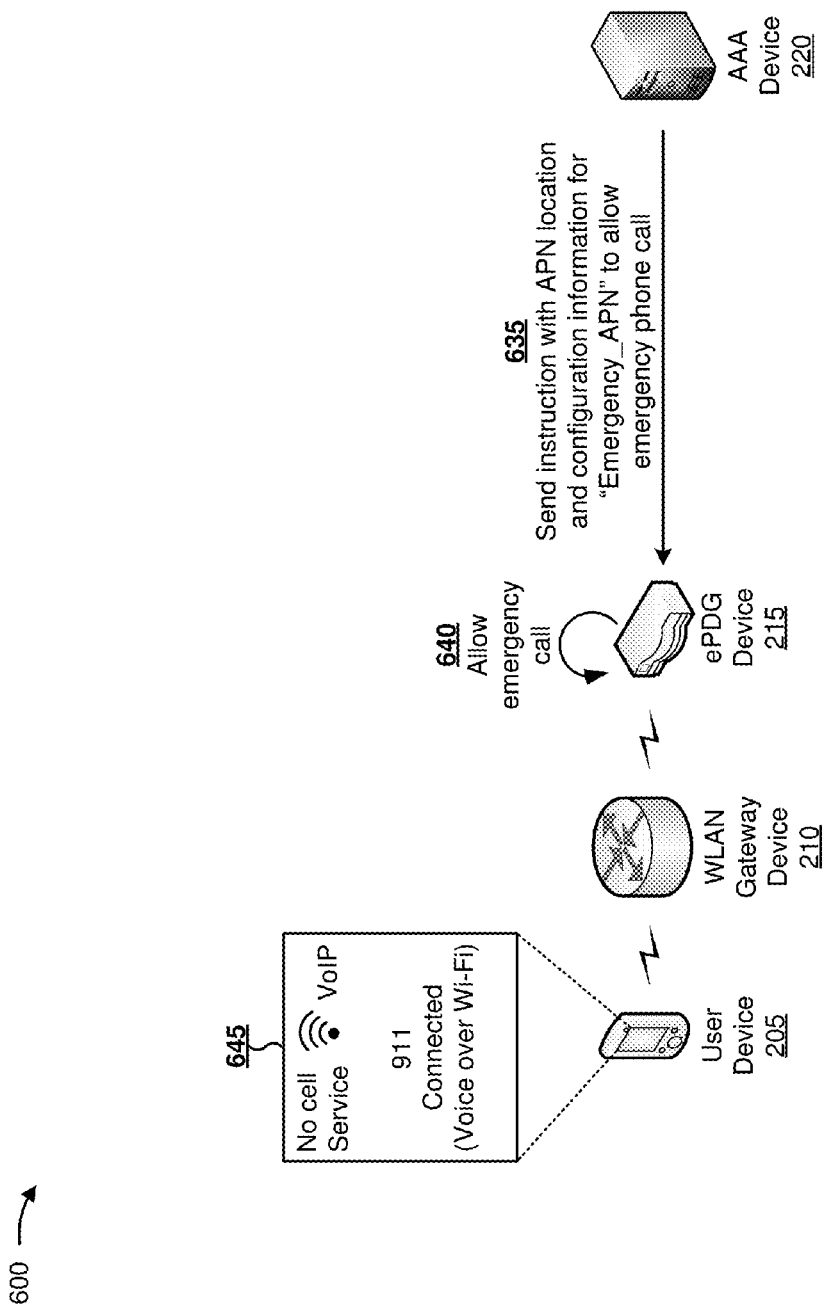

FIGS. 6A-6C are diagrams of an example implementation 600 relating to example process 400 shown in FIG. 4. FIGS. 6A-6C show an example of supporting emergency phone calls using voice over wireless local area network (VoWLAN) for a user device that is not registered with an operator network.

As shown in FIG. 6A, and by reference number 605, assume that user device 205, which is not registered with operator network 255, is making an emergency phone call using VoWLAN (e.g., voice over Wi-Fi) via WLAN gateway device 210 and ePDG device 215. As shown by reference number 610, ePDG device 215 sends a request, to AAA device 220, to authenticate user device 205 for the emergency phone call. As shown by reference number 615, AAA device 220 authenticates user device 205 regardless of whether user device 205 is registered with operator network 255 because user device 205 is attempting to establish an emergency phone call. AAA device 220 sends an authentication acceptance message to ePDG device 215, indicating that user device 205 has been authenticated.

As shown in FIG. 6B, and by reference number 620, ePDG device 215, having received the authentication acceptance message, sends a request to establish the emergency phone call using the emergency access point name (APN) of "Emergency_APN." As shown by reference number 625, AAA device 220 verifies whether "Emergency_APN" is included in a list of preconfigured APNs. As shown by reference number 630, "Emergency_APN" is included in a data structure, stored by AAA device 220, that associates "Emergency_APN" with a location of the access point (AP Location) identified by the internet protocol (IP) address 15.131.16.12.

As shown in FIG. 6C, and by reference number 635, AAA device 220 sends, to ePDG device 215, an instruction to allow the emergency phone call. The instruction identifies the location of the access point for "Emergency_APN" (e.g., the IP address 15.131.16.12) and the configuration information for "Emergency_APN." As shown by reference number 640, ePDG device 215 allows the emergency phone call for user device 205. As shown by reference number 645, user device 205 is allowed to establish the emergency phone call even though user device 205 is not registered with operator network 255. In this implementation, AAA device 220 may allow more emergency phone calls by allowing user devices 205, which request to make an emergency phone call using an emergency APN, to make emergency phone calls as long as the emergency APN is included in a list of preconfigured APNs stored by AAA device 220.

As indicated above, FIGS. 6A-6C are provided merely as an example. Other examples are possible and may differ from what was described with regard to FIGS. 6A-6C.

Implementations described herein ensure that user devices 205, such as those that have not been properly provisioned to make emergency phone calls using a VoWLAN service or are not registered with the operator network 255, have access to emergency services when making an emergency phone call using VoWLAN.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
receive a first request to authenticate a user device for an emergency phone call requested by the user device via a wireless local area network (WLAN);
authenticate the user device based on the first request;
provide an authentication acceptance message, indicating that the user device is authenticated, based on authenticating the user device;
receive a second request, based on providing the authentication acceptance message, to establish the emergency phone call,
the second request including an emergency access point name (APN);
determine that the emergency APN is not provisioned for the user device; and
provide, based on determining that the emergency APN is not provisioned, an instruction to allow the emergency phone call from the user device using the emergency APN.

2. The device of claim 1, where the one or more processors, when providing the instruction to allow the emergency phone call, are to:
verify that the emergency APN is included in a list of preconfigured APNs; and
provide the instruction based on verifying that the emergency APN is included in the list of preconfigured APNs.

3. The device of claim 1, where the one or more processors, when authenticating the user device, are to:
determine, without providing information to another device, that the first request is for the emergency phone call; and
authenticate the user device based on determining that the first request is for the emergency phone call.

4. The device of claim 1, where the one or more processors, when authenticating the user device, are to:
determine, based on providing information to another device, that the user device is registered on an operator network associated with the device; and
authenticate the user device based on determining that the user device is registered on the operator network.

5. The device of claim 4, where the information provided to the other device includes a user device identifier that identifies the user device.

6. The device of claim 1, where the one or more processors, when determining that the emergency APN is not provisioned for the user device, are to:
request user profile information for the user device;
receive the user profile information based on requesting the user profile information;
determine that the user profile information does not include configuration information associated with the emergency APN; and
determine that the emergency APN is not provisioned based on determining that the user profile information does not include the configuration information.

7. The device of claim 1, where the one or more processors, when providing the instruction, are to:
receive user profile information associated with the user device;
verify that the user profile information includes information that indicates that the user device is allowed to make the emergency phone call;
verify that the emergency APN is included in a list of preconfigured APNs; and provide the instruction based on verifying that the emergency APN is included in the list of preconfigured APNs and based on the information that indicates that the user device is allowed to make the emergency phone call.

8. A non-transitory computer-readable medium storing instructions, the instructions comprising: one or more instructions that, when executed by one or more processors, cause the one or more processors to:
receive a first request to authenticate a user device for an emergency phone call requested by the user device via a wireless local area network (WLAN);
authenticate the user device based on the first request;
send an authentication acceptance message, indicating that the user device is authenticated, based on authenticating the user device;
receive a second request, based on providing the authentication acceptance message, to establish the emergency phone call,
the second request including an emergency access point name (APN);
verify that the emergency APN is included in a list of preconfigured APNs; and
provide an instruction to allow the emergency phone call, from the user device using the emergency APN, based on verifying that the emergency APN is included in the list of preconfigured APNs.

9. The non-transitory computer-readable medium of claim 8, where the one or more instructions, that cause the one or more processors to authenticate the user device, cause the one or more processors to: determine that the first request is for the emergency phone call; and authenticate the user device based on determining that the first request is for the emergency phone call.

10. The non-transitory computer-readable medium of claim 8, where the one or more instructions, that cause the one or more processors to authenticate the user device, cause the one or more processors to: determine that the user device is registered with an operator network providing service for the emergency phone call; and authenticate the user device based on determining that the user device is registered with the operator network.

11. The non-transitory computer-readable medium of claim 8, where the one or more instructions, that cause the one or more processors to provide the instruction, cause the one or more processors to: receive user profile information for the user device; determine that the user profile information includes information that indicates that the user device is allowed to make the emergency phone call; and provide the instruction based on determining that the user profile information includes information that indicates that the user device is allowed to make the emergency phone call.

12. The non-transitory computer-readable medium of claim 8, where the one or more instructions, that cause the one or more processors to verify that the emergency APN is included in the list of preconfigured APNs, cause the one or more processors to: determine that the emergency APN is not provisioned for the user device; and verify that the emergency APN is included in the list of preconfigured APNs based on determining that the emergency APN is not provisioned for the user device.

13. The non-transitory computer-readable medium of claim 8, where the one or more instructions, that cause the one or more processors to verify that the emergency APN is included in the list of preconfigured APNs, cause the one or more processors to: verify that the emergency APN is included in the list of preconfigured APNs without determining whether the user device is provisioned for the emergency phone call via the WLAN.

14. The non-transitory computer-readable medium of claim 8, where the one or more instructions, that cause the one or more processors to verify that the emergency APN is included in the list of preconfigured APNs, cause the one or more processors to: send a message to verify whether the user device is provisioned for the emergency phone call via the WLAN; receive, based on sending the message, an indication that the user device is not provisioned for the emergency phone call via the WLAN; and verify that the emergency APN is included in the list of preconfigured APNs based on receiving the indication that the user device is not provisioned.

15. A method, comprising:
receiving, by a device, a first request to authenticate a user device for an emergency phone call requested by the user device via a wireless local area network (WLAN);
authenticating, by the device, the user device based on at least one of:
determining that the first request is for the emergency phone call, or
determining that the user device is registered with an operator network associated with the device;
providing, by the device, an authentication acceptance message, indicating that the user device is authenticated, based on authenticating the user device;
receiving, by the device, a second request to establish the emergency phone call, based on providing the authentication acceptance message,
the second request including an emergency access point name (APN); and
providing, by the device, an instruction to allow the emergency phone call, via the WLAN and from the user device using the emergency APN, regardless of whether the user device is provisioned for the emergency phone call.

16. The method of claim 15, where authenticating the user device comprises:
receiving a user device identifier associated with the user device,
the user device identifier being included in the first request; and
authenticating the user device based on a comparison of the user device identifier and a plurality of user device identifiers registered with the operator network associated with the device.

17. The method of claim 15, where providing the instruction to allow the emergency phone call comprises:
verifying that the emergency APN is included in a list of preconfigured APNs; and
providing the instruction based on verifying that the emergency APN is included in the list of preconfigured APNs.

18. The method of claim 15, where authenticating the user device comprises:
determining, without providing information to another device, that the first request is for the emergency phone call; and
authenticating the user device based on determining that the first request is for the emergency phone call.

19. The method of claim 15, where authenticating the user device comprises:
determining, based on providing information to another device, that the user device is registered with the operator network; and authenticating the user device based on determining that the user device is registered with the operator network.

20. The method of claim 15, where providing the instruction comprises:
   requesting user profile information for the user device;
   receiving the user profile information based on requesting the user profile information;
   determining that the user profile information does not include configuration information associated with the emergency APN;
   determining that the emergency APN is not provisioned based on determining that the user profile information does not include the configuration information;
   verifying that the emergency APN is included in a list of preconfigured APNs based on determining that the emergency APN is not provisioned for the user device; and
   providing the instruction to allow the emergency phone call based on verifying that the emergency APN is included in the list of preconfigured APNs.

* * * * *